United States Patent Office 2,815,365
Patented Dec. 3, 1957

2,815,365

NEUTRAL POLYCHLORO-ALIPHATIC ACID ESTERS OF POLYHYDROXYPHENOLS

Herman O. Senkbeil and Harry F. Brust, Midland, Mich., assignors to The Dow Chemical Company, Midland, Mich., a corporation of Delaware No Drawing. Application October 12, 1956, Serial No. 615,722

6 Claims. (Cl. 260—479)

This invention relates to the neutral esters of the polyhydroxyphenols and the polychloro-aliphatic monocarboxylic acids such as the $\alpha,\alpha$-dichloro-aliphatic acids and $\alpha,\alpha,\beta$-trichloro-aliphatic acids containing from 3 to 5 carbon atoms, inclusive, and trichloroacetic acid. These fully esterified polyhydroxyphenols or neutral esters are viscous liquids or crystalline solids somewhat soluble in many organic solvents and of low solubility in water. They have been found to be active as plant growth control materials and are adapted to be employed as active toxic constituents in dust and liquid compositions for the control of the growth and killing of weeds and for the sterilization of soil with regard to plant growth. They are also useful as parasiticides for the control of many insect, fungal and bacterial organisms such as *Alternaria solani* and *Panagrellus silusae*.

The new compounds may be prepared by reacting together (1) a polyhydroxyphenol and (2) a polychloro-lower aliphatic-monocarboxylic acid anhydride having the formula $$\begin{array}{c} R \\ \phantom{R}\searrow \\ \phantom{RR}O \\ \phantom{R}\nearrow \\ R \end{array}$$

wherein R represents an $\alpha,\alpha$-dichloroacyl or $\alpha,\alpha,\beta$-trichloroacyl radical containing from 3 to 5 carbon atoms, inclusive, or trichloroacetyl. Suitable polyhydroxyphenols include pyrocatechol, hydroquinone, resorcinol, pyrogallol, 1,2,4,5-benzene tetrol, tetrachlorohydroquinone, 4,6-dichlororesorcinol and 4-chloropyrocatechol. The reaction takes place smoothly at the temperature range of from 90° to 180° C. with the production of the desired neutral ester and polychloro-lower aliphatic acid of reaction. Good results are obtained when one molecular proportion of the polyhydroxyphenol is reacted with an amount of the polychloro-lower aliphatic acid anhydride equal in moles to at least the number of hydroxyl units in the employed polyhydroxyphenol. A large excess of the acid anhydride may be employed in the reaction mixture since such excess does not appreciably affect the course of the reaction. The removal from the reaction zone of the polychloro-lower aliphatic-monocarboxylic acid of reaction as formed generally results in optimum yields of the desired ester products.

In carrying out the reaction, the polyhydroxyphenol or chloro-polyhydroxyphenol and polychloro-lower aliphatic-monocarboxylic acid anhydride are mixed together and the resulting mixture heated at a temperature of from 90–180° C. for a period of time to complete the reaction. The heating may be carried out under reduced pressure and at a temperature at which the polychloro-lower aliphatic acid of reaction boils to effect the removal of by-product polychloro-lower aliphatic-monocarboxylic acid as formed. Upon completion of the reaction, the desired product may be separated by fractional distillation under reduced pressure. When the desired product precipitates as a crystalline solid in the cooled reaction mixture, this solid product may be separated and purified by recrystallization from various organic solvents.

The following examples illustrate the invention but are not be construed as limiting:

*Example 1.*—Pyrocatechol bis-($\alpha,\alpha,\beta$-trichloropropionate)

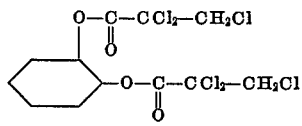

A mixture of 27.5 grams (0.25 mole) of pyrocatechol and 182 grams (0.54 mole) of $\alpha,\alpha,\beta$-trichloropropionic anhydride was heated with stirring at a temperature of from 111° to 138° C. and at a reduced pressure of 5 millimeters for about 5 hours. The heating was carried out with the continuous distillation of the $\alpha,\alpha,\beta$-trichloropropionic acid of reaction as formed and until no further substantial amounts of acid were liberated. The reaction mixture was then heated at temperatures gradually increasing up to 187° C. at 5 millimeters pressure to remove low boiling constituents and obtain a pyrocatechol bis-($\alpha,\alpha,\beta$-trichloropropionate) product as a viscous liquid residue. This product had a chlorine content of 48.2 percent compared to the calculated value of 49.65 percent.

*Example 2.*—Pyrocatechol bis-($\alpha,\alpha$-dichloropropionate)

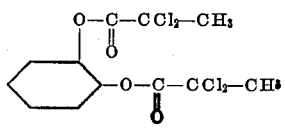

27.5 grams (0.25 mole) of pyrocatechol and 170 grams (0.634 mole) of $\alpha,\alpha$-dichloropropionic anhydride were mixed and heated with stirring at a temperature of from 98° to 150° C. and at a reduced pressure of 10 millimeters for a period of 15 hours. The heating was carried out with the continuous distillation of $\alpha,\alpha$-dichloropropionic acid as formed and until no further substantial amounts of acid were liberated. The reaction mixture was then fractionally distilled under reduced pressure to separate a pyrocatechol bis-($\alpha,\alpha$-dichloropropionate) product as a viscous liquid boiling at 123°–129° C. at 0.08 millimeter pressure. This product contained 39.5 percent chlorine compared to the calculated value of 39.40 percent.

*Example 3.*—Resorcinol bis-($\alpha,\alpha$-dichloropropionate)

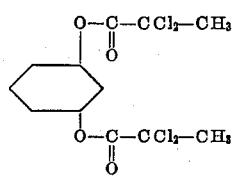

Resorcinol (27.5 grams, 0.25 mole) was mixed with 174.2 grams (0.65 mole) of $\alpha,\alpha$-dichloropropionic anhydride and the resulting mixture heated with stirring at a temperature of 150° C. for a period of 16 hours. Following the heating period, the reaction mixture was fractionally distilled under reduced pressure to separate a resorcinol bis-($\alpha,\alpha$-dichloropropionate) product as a viscous liquid boiling at 143°–144° C. at 0.7 millimeter pressure and having a refractive index n/D of 1.5185 at 25° C.

*Example 4.—Tetrachlorohydroquinone bis-(α,α-dichloropropionate)*

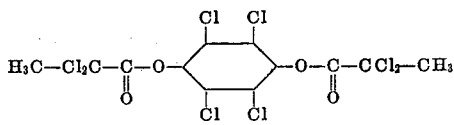

A mixture of 62 grams (0.25 mole) of tetrachlorohydroquinone and 141 grams (0.52 mole) of α,α-dichloropropionic anhydride was heated with stirring for a period of about 16 hours and at a temperature of from 168° C. to 175° C. After the heating period, the reaction mixture was cooled to precipitate a tetrachlorohydroquinine bis-(α,α-dichloropropionate) product as a white solid having a melting point of 249°–251° C. and a chlorine content of 56.2 percent compared to the calculated value of 56.98 percent.

*Example 5.—3,6-dichloro-1,2,4,5-benzenetetrol tetra-(α,α-dichloropropionate)*

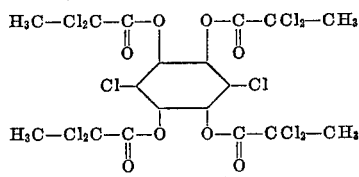

A mixture of 29.6 grams (0.14 mole) of 3,6-dichloro-1,2,4,5-benzenetetrol and 166.2 grams (0.62 mole) of α,α-dichloropropionic anhydride was heated with stirring at a temperature of from 135° to 162° C. for a period of 4.5 hours. The reaction mixture was then cooled to 60° C. and poured into methanol to precipitate the desired ester product as a white crystalline solid. This product was separated by filtration, dried and found to melt at 202°–205° C. and to have a chlorine content of 50.6 percent compared to the calculated value of 49.87 percent.

*Example 6.—Pyrogallol tris-(α,α-dichlorobutyrate)*

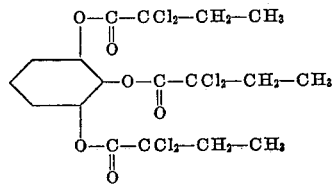

This compound is prepared in a manner similar to that described in Example 2 by heating a mixture of 0.33 mole of pyrogallol and 1.0 mole of α,α-dichlorobutyric anhydride. The α,α-dichlorobutyric acid formed as a by-product is removed by distillation during the heating period and the residue thereafter fractionally distilled under reduced pressure to separate a pyrogallol tris-(α,α-dichlorobutyrate) product as a viscous liquid having a molecular weight of 543.

*Example 7.—4-chlororesorcinol bis-(trichloroacetate)*

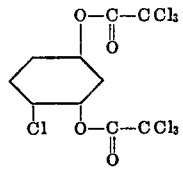

A mixture consisting of one mole of 4-chlororesorcinol and two moles of trichloroacetic anhydride is heated at about 150° C. and under a reduced pressure of 10 millimeters while continuously removing the trichloroacetic acid of reaction. Following the heating period, the reaction mixture is fractionally distilled under reduced pressure to separate a 4-chlororesorcinol bis-(trichloroacetate) product as a colorless viscous liquid having a molecular weight of 435.

In a similar manner other fully esterified polyhydroxyphenols may be prepared as follows:

2,3-dichlorohydroquinone bis-(α,α-dichlorovalerate) by the reaction of one mole of 2,3-dichlorohydroquinone and at least two moles of α,α-dichlorovaleric anhydride.

3,5-dichloropyrocatechol bis-(α,α,β-trichlorobutyrate) by the reaction of one mole of 3,5-dichloropyrocatechol and at least two moles of α,α,β-trichlorobutyric anhydride.

4,5,6-trichloropyrogallol tris-(α,α-dichloropropionate) by the reaction of one mole of 4,5,6-trichloropyrogallol and at least three moles of α,α-dichloropropionic anhydride.

Tetrachlororesorcinol bis-(α,α,β-trichloropropionate) by the reaction of one mole of tetrachlororesorcinol and at least two moles of α,α,β-trichloropropionic anhydride.

Hydroquinone bis-(α,α,β-trichlorovalerate) by the reaction of one mole of hydroquinone and at least two moles of α,α,β-trichlorovaleric anhydride.

Pyrogallol tris-(α,α-dichloropropionate) by the reaction of one mole of pyrogallol and at least three moles α,α-dichloropropionic anhydride.

Resorcinol bis-(α,α-dichlorobutyrate) by the reaction of one mole of resorcinol and at least two moles of α,α-dichlorobutyric anhydride.

The neutral esters of the present invention are effective as herbicides for the killing of weeds and the sterilization of soil with regard to plant growth. They are also valuable as parasiticides and are adapted to be employed for the control of insect and fungal organisms such as *Alternaria solani*. For such use the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of wetting, dispersing or emulsifying agents. In representative operations, 100 percent controls of the growth of the seeds and emerging seedlings of oats and canary grass have been obtained with resorcinol bis-(α,α-dichloropropionate) when applied at the rate of 20 pounds per acre to soil previously planted with said plant species.

We claim:

1. A neutral ester of a polyhydroxyphenol and a polychloro-monocarboxylic acid wherein the acid is selected from the group consisting of the α,α-dichloro-aliphatic acids and α,α,β-trichloro-aliphatic acids containing from 3 to 5 carbon atoms, inclusive, and trichloroacetic acid.
2. Resorcinol bis-(α,α-dichloropropionate).
3. Tetrachlorohydroquinone bis-(α,α-dichloropropionate).
4. Pyrocatechol bis-(α,α,β-trichloropropionate).
5. Pyrocatechol bis-(α,α-dichloropropionate).
6. 3,6-dichloro-1,2,4,5-benzenetetrol tetra-(α,α-dichloropropionate).

No references cited.